United States Patent [19]

Brezny

[11] Patent Number: 5,384,290
[45] Date of Patent: Jan. 24, 1995

[54] POROUS CERAMIC BEADS

[75] Inventor: Rasto Brezny, Catonsville, Md.

[73] Assignee: W. R. Grace & Co.-Conn., New York, N.Y.

[21] Appl. No.: 168,804

[22] Filed: Dec. 16, 1993

Related U.S. Application Data

[62] Division of Ser. No. 110,607, Aug. 23, 1993, Pat. No. 5,322,821.

[51] Int. Cl.⁶ .............................................. C04B 38/06
[52] U.S. Cl. ........................................ 501/81; 501/80; 501/82; 264/43; 264/44
[58] Field of Search ............... 501/81, 82, 80; 264/43, 264/44

[56] References Cited

U.S. PATENT DOCUMENTS

| | | | |
|---|---|---|---|
| 3,833,386 | 9/1974 | Wood et al. | 501/82 |
| 5,082,607 | 1/1992 | Tange et al. | 264/44 |
| 5,108,956 | 4/1992 | Inoue et al. | 501/81 |

Primary Examiner—Mark L. Bell
Assistant Examiner—Deborah Jones
Attorney, Agent, or Firm—Mary Ann Capria

[57] ABSTRACT

Ceramic beads having a bimodal pore distribution are prepared by a process involving a) formation of a ceramic particle slurry, b) adding a foamable prepolymer to the slurry to form a mixture, c) dispersing the mixture as beads in a second liquid, d) polymerizing and foaming the prepolymer, e) recovering the beads and firing them to remove the polymer and bond the ceramic particles. The beads can optionally be joined by sintering. Beads with a monodal pore distribution can be made by using a non-foaming prepolymer.

13 Claims, No Drawings

POROUS CERAMIC BEADS

This is a division of application Ser. No. 08/110,607, filed Aug. 23, 1993, now U.S. Pat. No. 5,322,821.

BACKGROUND OF THE INVENTION

Porous ceramic materials have received growing attention in recent years for their potential use as catalyst supports, molten metal filters, diesel exhaust filters, combustion burners, thermal insulation, etc. The specific use of the ceramic will depend on the size of the porous ceramic body, the nature of the porosity (closed or open), and ceramic composition among other factors.

These porous ceramic materials have been made by several methods over the years. A good overview of these methods can be found in an article "Processing of Porous Ceramics" by J. Saggio-Woyansky, American Ceramic Society Bulletin vol. 71, No. 11, November 1992, p. 1674–1682. Two principal methods are a) impregnation of a polymer "sponge" with a ceramic slurry followed by firing to remove the polymer, and b) foaming of a ceramic slurry followed by firing the foam. The sponge technique generally produces open (reticulated) pore structures. The foaming technique may produce reticulate and/or closed (vesiculated) pores depending on the foaming technique used and the conditions employed.

For many catalyst support and biological support applications, it is generally desirable to have a ceramic with predominantly reticulate porosity to increase the surface area of the ceramic which is accessible to the medium surrounding the porous ceramic. Further, it is often desirable that the porous ceramic have combinations of micropores and reticulate macropores to allow greater access to the ceramic surface. Interconnected macropores facilitate the passage of fluid through the ceramic.

For many catalyst and biological support applications, the support is typically placed in contact with a fluid reaction medium or biological medium. In these and other applications, the porous ceramic is often used in the form of beads. Generally, spherical beads are preferred. Unfortunately, the need for such ceramic beads with reticulate macroporosity has been unmet.

SUMMARY OF THE INVENTION

The invention provides porous ceramic materials to meet these needs. The invention encompasses ceramic beads having bimodal porosity distribution of micropores and reticulated macropores. Preferably, these porous ceramic beads are substantially spherical. The invention also encompasses monolithic ceramic bodies made by sintering the porous ceramic beads together.

The porous beads preferably have an average diameter of about 50–2000 $\mu$m, and a bimodal pore size distribution with macropores averaging about 10–200 $\mu$m in diameter and micropores averaging about 0.001–1.0 $\mu$m in diameter.

The invention further provides a method for making porous ceramic beads. In its broadest aspect, the method of the invention comprises:

a) forming a slurry by combining ceramic particles with a first liquid, b) mixing the slurry with an organic prepolymer to form a mixture, c) combining the mixture with a second liquid, wherein the first liquid is immiscible in the second liquid, to form a dispersed phase of the mixture in the second liquid, d) polymerizing the prepolymer contained in the dispersed phase to form rigid beads, e) separating said rigid beads from the second liquid, and f) firing the rigid beads to remove the polymer and first liquid and to sinter the ceramic to form the porous ceramic beads.

In a further aspect, the method of the invention can be used to make ceramic beads having bimodal pore distribution by using a prepolymer which foams during the polymerization step. The beads formed are preferably substantially spherical.

DETAILED DESCRIPTION OF THE INVENTION

The porous ceramic beads of the invention are characterized by a bimodal pore distribution of micropores and reticulated macropores. The beads are preferably substantially spherical.

The beads preferably have average diameter of about 50–2000 $\mu$m, more preferably about 100–1000/$\mu$m. The macropores preferably have an average diameter of about 10–200/$\mu$m, more preferably about 50–125/$\mu$m. The micropores average preferably about 0,001–1.0 $\mu$m in diameter, more preferably about 0.01–1.0 $\mu$m. The macropores are preferably interconnected such that a fluid can enter the bead through one macropore and exit the bead by a different pore.

The beads are preferably substantially spherical in shape. If the beads are joined together to form a porous sintered body, some neck formation will typically occur where the beads are joined together. Such monolithic sintered bodies are also encompassed by the invention. For such sintered bodies, the interstices between the porous beads form a third level of porosity.

The ceramic material may be any known ceramic. Preferably, the ceramic includes a ceramic such as alumina, titania, zirconia, zirconium aluminum titanate, pseudoboemite, silica, silicon nitride, carbides and other nitrides. The ceramic may include mixtures of different ceramic materials. Sintering aids may also be included in the ceramic material.

The method of the invention enables the production of the beads of the invention which have a bimodal distribution of microporosity and reticulated macroporosity. The method of the invention may also be used to make beads having other pore configurations.

In its broadest aspect, the method of the invention comprises:

a) forming a slurry by combining ceramic particles with a first liquid, b) mixing the slurry with an organic prepolymer to form a mixture, c) combining the mixture with a second liquid, wherein the first liquid is immiscible in the second liquid, to form a dispersed phase of the mixture in the second liquid, d) polymerizing the prepolymer contained in the dispersed phase to form rigid beads, e) separating said rigid beads from the second liquid, and f) firing the rigid beads to remove the polymer and first liquid and to sinter the ceramic thereby forming porous ceramic beads.

While the ingredients may be combined in any manner, preferably the pH of the first liquid is adjusted (if necessary) to optimize the dispersion of the ceramic particles. In forming the ceramic slurry of step a), a dispersant may be added to facilitate dispersion of the ceramic particles. The pH is typically adjusted for the specific dispersant (if any) and to promote the later reaction of the prepolymer. The ceramic powder and dispersant (if any) would then be added with mixing to form the slurry. A polymerization catalyst (if any) may also be added at this time. Any suitable mixing means may be used. Sonicating with an ultrasonic horn and/or ball milling are examples of suitable mixing means.

The prepolymer may be added directly to the slurry. Alternatively, the prepolymer is first dissolved in a solvent identical to or miscible with the first liquid. The dissolved prepolymer may then be added to the slurry to form a mixture. The mixture is then poured into the second liquid which is immiscible with the first liquid. The second liquid is then agitated to form a dispersed phase of beads of the first liquid in the second liquid. The size of the beads may vary with the amount of agitation. Also, if the viscosity of the mixture is increased, the size of the beads may increase. An emulsifying surfactant or mixture of surfactants may be added to the second liquid beforehand to facilitate the formation and stabilization of the dispersion of the beads.

The prepolymer in the dispersed beads is polymerized as the beads form or shortly thereafter. Once the polymerization takes place, the beads become rigid. In order to obtain the beads of the invention having reticulated macroporosity, a prepolymer which foams as a result of the chemical reaction leading to polymerization is used as the prepolymer. The foaming preferably takes place in the course of the polymerization. If such a foamable prepolymer is used, a foam stabilizing surfactant may be added to the first liquid to control the size of the foam bubbles.

The rigid beads are then separated from the second liquid. Simple filtration or any other known method may be used. The beads are then fired to remove the polymer and sinter the ceramic particles which are contained in the beads. The firing conditions may vary depending on the specific ceramic material in the beads and the desired degree of sintering. Where it is desired to fuse the beads together, more severe sintering conditions may be employed, but not so severe as to cause substantial loss of porosity. Where it is desired to sinter the individual beads without fusing them to each other, less severe sintering conditions are preferred. Flowing gas around the beads during firing or suspending the beads in gas during firing are two expedients that can be used to further hinder fusing of the beads. If some undesired fusing occurs, the beads can be separated with light milling (e.g. mortar and pestle).

As noted above, any known sinterable ceramic material may be used to form the beads. Such material may include a sintering aid(s). The particle size of the ceramic powder is preferably selected to yield interstitial micropores averaging about 0.001–1.0 μm in diameter more preferably about 0.01–1.0 μm. Particle sizes of about 0.1–10 μm are generally suitable.

The first liquid of step a) may be any liquid which is compatible with the ceramic, prepolymer and second liquid used. The first liquid should be substantially immiscible in the second liquid. Preferably, the first liquid is selected from the group consisting of water, acetone, chlorofluorocarbons, methylene chloride, and mixtures thereof. Water is most preferred.

The use of a dispersant (surfactant) in the slurry is not absolutely required, but it does generally facilitate formation of a well dispersed powder slurry containing 20 vol. % or more of powder. A preferred dispersant is an ammonium polyacrylate, Darvan ®821A sold by R. T. Vanderbilt Co. The amount of dispersant used is preferably about 0.5–5% based on the weight of the ceramic material. The amount used may vary depending on the surface area of the ceramic powder.

The water used is preferably deionized water. If adjustment of the pH is necessary to facilitate dispersion, any known pH adjusting agent may be used. For Darvan ® 821A, a slightly basic pH, about 8–10, is preferred. A base such as ammonium hydroxide or sodium hydroxide may be used to achieve a basic pH. The amount of first liquid used is preferably 20–60 wt. % based on the weight of the ceramic powder.

The prepolymer may be any organic prepolymer which can be easily polymerized while in the emulsion. The prepolymer is preferably hydrophylic. For production of the reticulated macropore beads of the invention, the prepolymer is preferably one which foams on polymerization. Examples of suitable non-foaming prepolymers are such as Hypol ® XP-5. Examples of suitable foaming prepolymers are foamable isocyanate capped polyoxyethylene polyols such as Hypol ® 2000, 3000 or 4000. The amount of prepolymer used is preferably an amount sufficient to form a weight ratio of prepolymer to water in the first liquid of about 1: 0.5–2.5, more preferably about 1: 1.0–2.0. Other suitable prepolymers may be found in U.S. Pat. No. 3,833,386 the disclosure of which is incorporated herein by reference. In some circumstances, use of a polymerization catalyst such as sodium borate may also be desired.

If a foamable prepolymer is used, a foam stabilizing surfactant may also be added to the mixture containing the prepolymer. The surfactant acts to regulate the size of the foam bubbles produced which in turn determines the size of the macropores in the porous bead product. Any known surfactant capable of performing this function may be used. Nonionic water dispersible surfactants such as the polyoxypropylene/polyoxyethylene copolymer surfactant sold as Pluronic ® F-88 by BASF-Wyandotte Corp. are preferred surfactants. The amount of foam stabilizing surfactant used is preferably about 0–5 wt. % based on the weight of the prepolymer, more preferably about 0.1–3 wt. %.

In some instances, it may also be desirable to add an agent to the slurry to strengthen the bonding between the ceramic particles. This may be especially suitable for high porosity embodiments such as for catalysts. For example, with pseudoboehmite ceramic particles, urea can be added to the slurry to induce bonding of the ceramic particles by gellation.

The second liquid may be any liquid which is immiscible with the first liquid. The second liquid is preferably an oil such as a hydrocarbon oil or cyclohexane. The amount of second liquid should be greater than the amount of ceramic-prepolymer mixture such that the mixture forms a dispersion of particles in the second liquid. An emulsifying surfactant may be added to the second liquid to stabilize the dispersion of the beads formed in the dispersion. This surfactant is preferably one with an HLB number of about 4–8. A preferred surfactant for this purpose is OLOA ® 1200 sold by Chevron Corp or Pluronic ® L-121 a polyoxypropylene/polyoxyethylene copolymer sold by BASF-Wyandotte. The amount of emulsifying surfactant used in the second liquid is preferably about 0–5 wt. % based on the weight of the second liquid, more preferably about 0.1–3 wt. %.

The following examples are presented to further illustrate the invention. The invention is not limited to the specifics of the examples.

EXAMPLE 1

A slurry of alumina powder was made by mixing:
70 g $Al_2O_3$
30 g $H_2O$ pH 9.5
0.7 g Darvan 821A
0.3 g Sodium Borate Slurry was mixed and dispersed using an ultrasonic horn. 10 g of water was mixed with 8 g of Hypol® XP-5 prepolymer and stirred to dissolve the prepolymer. To this was added 20 g of above slurry and stirred. The mix was poured into 75 g of hydrocarbon oil containing 0.75 g. OlOA®1200 dispersant. The oil was stirred using a motor driven agitator at 200 rpm to form an emulsion of spheres with average size ~200μm. The spheres were filtered from the oil and sintered to 1600° C in an alumina crucible. The sintered spheres contained micropores ~1 μm in size with no macropores. The spheres loosely sintered together but could be broken apart in a mortar and pestle. The spherical $Al_2O_3$ particles were 100–306 μm in size.

EXAMPLE 2

A slurry of alumina powder was made by mixing:
70 g $Al_2O_3$
30 g $H_2O$ pH 9.5
0.7 g Darvan 821A
0.3 g Sodium Borate Slurry was mixed and dispersed using an ultrasonic horn. 10 g of water was mixed with 8 g of Hypol® XP-5 prepolymer and stirred for 3 min. to dissolve the prepolymer. To this 20 g of the above slurry was added and stirred. The mix was poured into 75 g of cyclohexane containing 0.075 g Span® 60 surfactant. The two liquids were stirred using a motor driven agitator at 400 rpm to form an emulsion of spheres with an average size of 100 μm. The spheres were filtered from the cyclohexane and sintered to 1200° C. in an alumina crucible. The sintered spheres contained micropores 0.1μm in size with no macropores.

EXAMPLE 3

To the above $Al_2O_3$ slurry was added 0.6 g Pluronic F-68 surfactant. 26 g of this slurry was mixed with 7 g Hypol® 6300 and mixed. The mixture was poured into 75 g hydrocarbon oil containing 0.75% OLOA® 1200. An emulsion was formed using a motor driven agitator at approximately 200 rpm. The mixture was stirred for 30 minutes until the Hypol® reacted and foamed resulting in foamed spherical particles. These were filtered from the oil, placed into an alumina tray and sintered in flowing nitrogen to 1600° C. The spheres were grayish in color but did not sinter together. The remaining carbon in the spheres was burned off at 700° C. leaving white $Al_2O_3$ foam spheres 100–2000μm in size. The spheres contained fine pores (1 μm) and large interconnected macropores (50–200μm).

EXAMPLE 4

A slurry was made of zirconium aluminum titanate by mixing:

49 g Aluminum titanate
21 g Zirconium titanate
40 g $H_2O$ pH 9.5
0.8 g Pluronic L-62 surfactant
0.8 g Sodium borate 30 g of this slurry was mixed with 8 g of Hypol® 6300 prepolymer. Mixture was poured into 75 g hydrocarbon oil containing 3.75 OLOA® 1200 and emulsified using a high shear agitator at approximately 300 rpm. The speed was reduced to keep particles in suspension until they foamed and gelled. The foam spheres were finer and more uniform in size (50–200 μm). They were filtered and sintered to 1450° C.

EXAMPLE 5

A slurry way made by mixing 100 g AlOOH, 233 g $H_2O$, 4.5 g $HNO_3$, 6 g Acetic Acid. This was mixed in a blender for 10 minutes then poured into a beaker and aged for 3 hours. At this point, 4.7 g of Pluronic® F-88 surfactant was added as well as 50 g AlOOH powder and 6 g of urea.

30 g of the above slurry was mixed with 10 g of Hypol® 3000 prepolymer for about 20 sec. The mixture was poured into 100 g hydraulic oil containing 1 g OLOA® 1200 surfactant to form an emulsion using a motor driven agitator, at approximately 400 rpm. After 10 min. the beads were filtered from the oil and placed in an alumina crucible.

The beads were fired at 3°/min. to 400° C. to burn off the polyurethane and then 5°/min to 700° C. to convert to $\gamma$-$Al_2O_3$. The resultant beads had a surface area of 200 m²/g and 86% total porosity. The porosity was divided between macro (>600 Å) and micro (<600 Å) size range at 44 vol. % and 42 vol. %, respectively.

What is claimed is:

1. A method of making substantially spherical porous ceramic particles, said method comprising:
   a) forming a slurry by combining ceramic particles with a first liquid capable of reacting with an organic prepolymer,
   b) mixing said slurry with the organic prepolymer to form a mixture,
   c) combining said mixture with a second liquid, wherein the first liquid is immiscible in the second liquid, to form a dispersed phase of said mixture in the second liquid, wherein the prepolymer polymerizes to form rigid spherical particles,
   d) separating said rigid particles from said second liquid, and
   e) firing said rigid particles to remove said propolymer and first liquid and to sinter the ceramic to form said porous ceramic particles.

2. The method of claim 1 wherein said first liquid is selected from the group consisting of water, alcohols, acetone, chlorofluorocarbons, methylene chloride and mixtures thereof.

3. The method of claim 1 wherein said propolymer comprises a urethane-based propolymer.

4. The method of claim 1 wherein said second liquid comprises a material selected from the group consisting of hydrocarbon oils and cyclohexane.

5. The method of claim 1 wherein a said second liquid contains a dispersant.

6. The method of claim 1 wherein said ceramic is selected from the group consisting of alumina, zirconia, silica, titania, zirconium aluminum titanate, ceramic nitrides, ceramic carbides, pseudoboemite and mixtures thereof.

7. The method of claim 1 wherein said porous particles resulting in step e) have a bimodal pore size distribution.

8. The method of claim 1 wherein said combining step c) comprises agitating said mixture and said second liquid together.

9. The method of claim 7 wherein said bimodal pore size distribution comprises large pores having an average diameter of about 10–200 μm and small pores having an average diameter of about 0.001–1.0 μm.

10. The method of claim 1 wherein a foam-stabilizing surfactant is added to said first liquid in step a).

11. The method of claim 10 wherein said foam-stabilizing surfactant comprises a polyoxypropylene/polyoxyethylene copolymer.

12. The method of claim 1 wherein said second liquid further contains an emulsifying surfactant.

13. The method of claim 12 wherein said emulsifying surfactant comprises a polyoxypropylene/polyoxyethylene copolymer.

* * * * *